(12) United States Patent
Khorasaninejad et al.

(10) Patent No.: US 11,953,698 B1
(45) Date of Patent: Apr. 9, 2024

(54) SPATIALLY MULTIPLEXED DIFFRACTIVE LENS WITH EXTENDED DEPTH OF FIELD VIA PHASE CORRECTION

(71) Applicant: Leadoptik Inc., San Jose, CA (US)

(72) Inventors: Mohammadreza Khorasaninejad, Milpitas, CA (US); Huiqin Zhang, Philadelphia, PA (US); Jiang You, Fremont, CA (US)

(73) Assignee: Leadoptik Inc., San Jose, CA (US)

( * ) Notice: Subject to any disclaimer, the term of this patent is extended or adjusted under 35 U.S.C. 154(b) by 0 days.

(21) Appl. No.: 18/484,367

(22) Filed: Oct. 10, 2023

(51) Int. Cl.
*G02B 6/28* (2006.01)
*G02B 5/30* (2006.01)
*G02B 6/24* (2006.01)
*G02B 27/09* (2006.01)

(52) U.S. Cl.
CPC ....... *G02B 27/0905* (2013.01); *G02B 5/3083* (2013.01); *G02B 27/0944* (2013.01)

(58) Field of Classification Search
CPC ............ G02B 27/0905; G02B 27/0944; G02B 5/3083

USPC .......................................................... 359/618
See application file for complete search history.

(56) References Cited

U.S. PATENT DOCUMENTS

| | | | | |
|---|---|---|---|---|
| 5,715,316 A | * | 2/1998 | Steenblik | G09C 5/00 380/54 |
| 9,331,782 B2 | * | 5/2016 | Sorin | H04J 14/02 |
| 9,897,538 B2 | * | 2/2018 | Tearney | G01B 9/02091 |

* cited by examiner

*Primary Examiner* — Joseph P Martinez
*Assistant Examiner* — Grant A Gagnon
(74) *Attorney, Agent, or Firm* — Fenwick & West LLP

(57) ABSTRACT

A phase correction concept is introduced to improve the performance of a spatially multiplexed optic. In a specific example, the optic is a diffractive lens. A phase offset is added to extend the depth of field of the diffractive lens and increase its focusing intensity. This can result in increased signal-to-noise ratio. These diffractive lenses may be used for imaging, focusing, and/or delivering light to an area of interest. They may be used to realize miniaturized medical imaging based on different imaging modalities such as optical coherence tomography, Raman spectroscopy, and fluorescence microscopy. They may also be used for different purposes and applications, for example laser ablation.

17 Claims, 22 Drawing Sheets
(8 of 22 Drawing Sheet(s) Filed in Color)

SPATIALLY MULTIPLEXED DIFFRACTIVE LENS WITH EXTENDED DEPTH OF FIELD VIA PHASE CORRECTION

BACKGROUND

1. Technical Field

The present disclosure relates generally to spatially multiplexed optics using a phase correction concept, such as may be used in miniaturized optical imaging, illumination, and navigation systems.

2. Description of Related Art

Accurate diagnosis and treatment of diseases in internal organs such as the pulmonary airways, the coronary arteries, and the gastrointestinal tract are difficult due to the inaccessibility of lesions. This is the main drive behind the miniaturization of optical imaging, illumination (for therapeutic purposes), and navigation (guiding the biopsy needle or surgical devices) systems. Miniaturization often comes at the cost of reducing functionality. For example, to achieve a smaller form factor imaging system, it is difficult to cascade several components or have electrical or mechanical actuators. These limit the functionality of imaging systems such as depth of field that determine signal-to-noise ratio in imaging applications.

Spatial multiplexing is one approach to include multiple functions in a single optical element. In spatial multiplexing, different regions of the optic are used for different functions. However, these may interfere with each other, reducing the overall performance of the optic.

SUMMARY

According to some embodiments, a phase correction concept is introduced to improve the performance of a spatially multiplexed optic. In a specific example, the optic is a diffractive lens. A phase offset is added to extend the depth of field of the diffractive lens and increase its focusing intensity. This can result in an increased signal-to-noise ratio. These diffractive lenses may be used for imaging, focusing, and/or delivering light to an area of interest. They may be used to realize miniaturized medical imaging based on different imaging modalities such as optical coherence tomography, Raman spectroscopy, and fluorescence microscopy. They may also be used for different purposes and applications, for example, laser ablation.

In an aspect, a method for designing a spatially multiplexed optic is implemented on a computer system. The optic has two or more subapertures with corresponding optical functions. Complex amplitude profiles for the subapertures are determined, based on achieving the corresponding optical functions for the subapertures. A merit function is selected. It is indicative of an optical performance of the spatially multiplexed optic. A constant phase offset is added to one or more of the complex amplitude profiles, based on improving the merit function.

In a particular example, the spatially multiplexed optic is a multi-focal lens, for example as may be used in endoscopes. The subapertures of the multi-focal lens focus to different focal points. The complex amplitude profiles are phase profiles, and the phase profiles for the subapertures are determined based on focusing to the different focal points. The merit function is indicative of the focusing produced by the multi-focal lens. For example, it may be indicative of the depth of field of the focusing, or the intensity of the focusing.

Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings presented in this disclosure partially constitute the disclosure and illustrate different embodiments of the inventions. Furthermore, the drawings may contain captions and/or text that may explain certain embodiments of the present disclosure. These text and captions are included for non-limiting, explanatory/illustrative purposes of certain embodiments described in the present disclosure.

DETAILED DESCRIPTION OF THE PREFERRED EMBODIMENTS

Figure 1A:
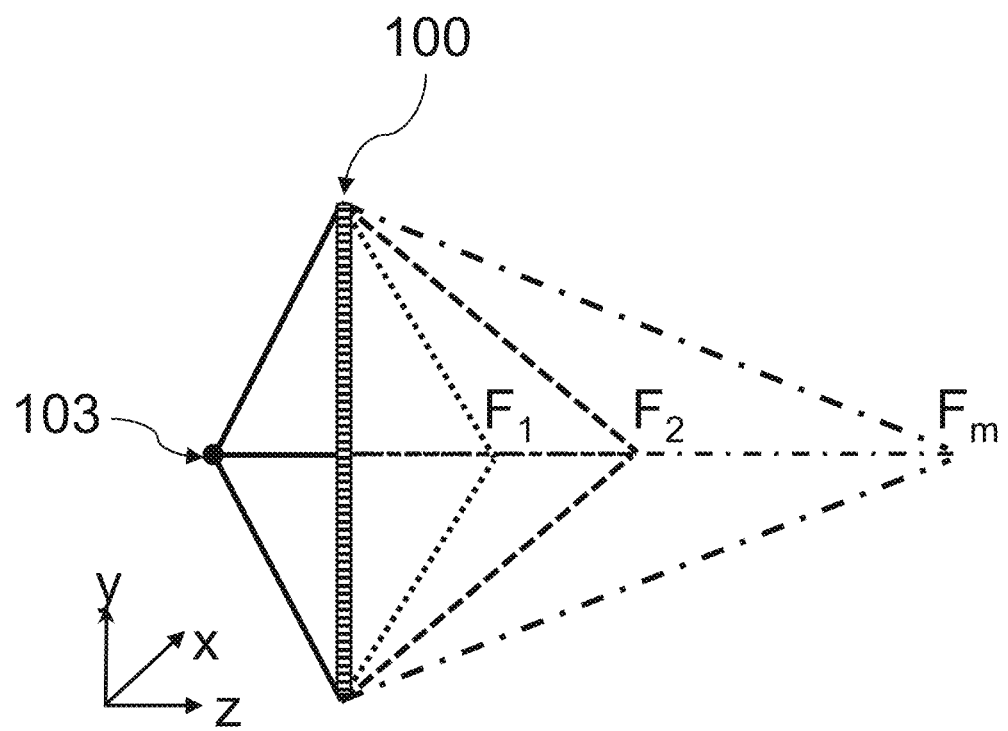
FIG. 1A is a side view of a multi-focal diffractive lens.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed. Embodiments of the disclosure are described more fully hereinafter with reference to the accompanying drawings; however, alternative configurations and embodiments are also possible without departing from the scope of the present disclosure. Thus, the present disclosure should not be construed as limited to the embodiments expressly set forth herein. Rather, the illustrated and described embodiments are provided as examples to convey the scope of the disclosure to those skilled in the art. In the drawings, the size and relative sizes of layers and regions may be exaggerated for clarity.

In certain aspects, a spatially multiplexed optic contains different subapertures. Each subaperture is designed for a different function. However, because the optic is spatially multiplexed, the different subapertures operate at the same time and they may interfere with each other. Phase offsets are added to subaperture(s) in order to control the relative phase between the different subapertures. This, in turn, can improve the interference effects between different subapertures and can improve the overall performance of the spatially multiplexed optic.

The following disclosure begins with some specific examples of spatially multiplexed diffractive lenses. The principles are then generalized to other types of spatially multiplexed optics and other types of functions for these optics.

Figure 1B:
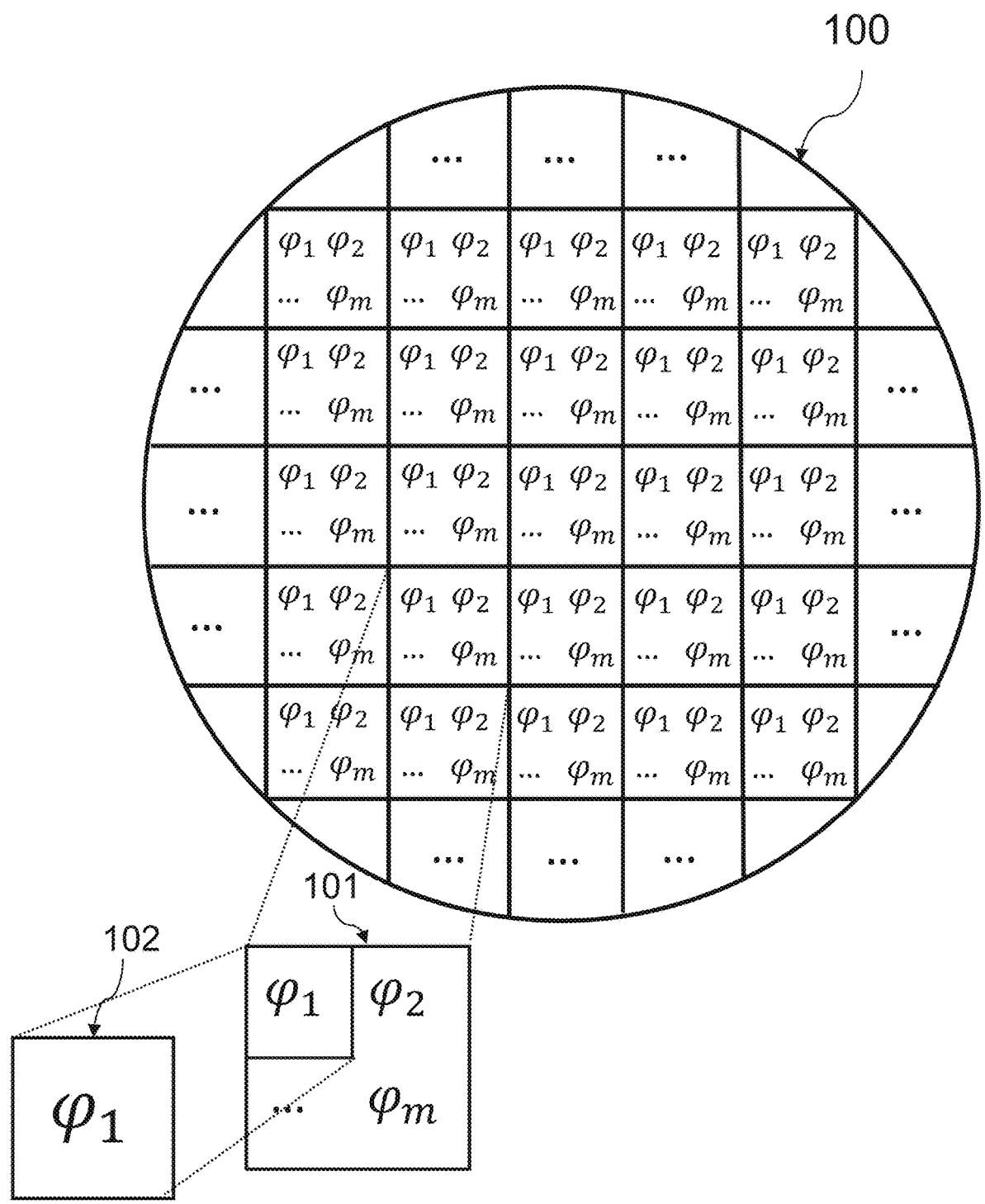
FIG. 1B shows spatial multiplexing of the multi-focal diffractive lens of FIG. 1A.

Advanced Diffractive Lens with Extended Depth of Field (DOF) Using Phase Offsets FIGS. 1A-B show a diffractive lens 100 that focuses a point source into multiple focal spots, $F_1, F_2, \ldots F_m$. It will be referred to as an advanced diffractive lens (ADL) because it uses the phase concepts described herein. FIG. 1A shows the geometry of focusing to multiple focal spots. The phase profile that achieves diffraction-limited focusing at a desired $m^{th}$ focus spot for a point source 103 is:

$$\varphi_m(x, y) = \frac{2\pi n}{\lambda}(D_{ps} + D_{im} - f) \quad (1)$$

$$D_{ps} = \sqrt{(x - x_{ps})^2 + (y - y_{ps})^2 + (z_0 - z_{ps})^2}$$

$$D_{im} = \sqrt{(x - x_{fm})^2 + (y - y_{fm})^2 + (z_0 - z_{fm})^2}$$

$$f = L + f_m$$

Here, (x, y) is the planar coordinate at the ADL plane, $\lambda$ is the wavelength, n is the refractive index of the medium, $z_0$ is the position of the ADL which is set as $z_0=0$ as the reference position, L is the distance between the light point source 103 and the center of the ADL, $f_m$ is the $m^{th}$ focal length. $(x_{ps}, y_{ps}, z_{ps})$ is the position of the point source 103, $(x_{fm}, y_{fm}, z_{fm})$ is the position of the $m^{th}$ focal spot $(F_m)$. For simplicity for the case shown in FIG. 1A, we consider we have an on-axis transmissive ADL: $x_{ps}=y_{ps}=x_{fm}=y_{fm}=0$.

To generate multiple focuses along the same axis, as illustrated in FIG. 1A, the ADL required phase at each coordinate of (x, y) is formulated as:

$$\phi(x, y) = \sum_{m=1}^{M}[(\varphi_m + C_m) \times A_m(x, y)] \quad (2)$$

Here, M is the total number of focal points, $\varphi_m$ is the phase profile for the $m^{th}$ focal point. Each phase profile $\varphi_m$ produces a spherical wave focusing to the $m^{th}$ focal point. $A_m(x, y)$ is a binary matrix that implements the spatial multiplexing. It assigns each ADL unit cell 102 (FIG. 1B) to different focus spots.

FIG. 1B shows the schematic of ADL 100 and the spatial multiplexed phase implementation. The aperture of lens 100 is divided into M subapertures, one for each of the focal points $F_m$. In this example, the lens 100 is divided into an array of supercells 101. Each supercell contains a pattern of unit cells 102, which include the phase profiles of $\varphi_1, \varphi_2, \ldots, \varphi_m$, corresponding to the focal points $F_1, F_2, \ldots, F_m$. The subaperture for a focal spot $F_m$ is then the collection of units cells 102 with phase profile $\varphi_m$. $C_m$ is a constant phase offset that can be set from $-\pi$ to $\pi$, independent of different focus spots. The constant phase offset will not affect the DOF of a single-focus lens design but will affect the interaction from different subapertures in the spatially multiplexed design.

One factor to determine the light diffraction along the focal axis is the phase mismatch error $E_m$. It is defined as:

$$E_m(x,y)=|\phi(x,y)-(\varphi_m(x,y)+C_m)| \quad (3)$$

Here, $\phi(x, y)$ is the spatially multiplexed phase profile produced by all the subapertures and $\phi_m(x, y)$ is the ideal phase profile for focusing to the $m^{th}$ focal position if there were no spatial multiplexing. $E_m(x, y)$ is a phase mismatch error profile relative to the $m^{th}$ phase which is designated to the $m^{th}$ focal position. Because phase error is modulo $2\pi$, the phase error is defined as the absolute value of the minimum phase differences. For example, a phase difference of $-0.1\pi$ is a phase error of $|-0.1\pi|=+0.1\pi$, rather than a phase error of $-0.1\pi$ or $+1.9\pi$. To quantify the total error, we can evaluate the phase error mismatch for all desired phases defined as the error:

$$E_{mean} = \text{mean}\left(\sum_{m=1}^{M} E_m\right) \quad (4)$$

By selecting values of the phase constant $C_m$ for different phases $\varphi_m(x, y)$, we can engineer an evolution of the light diffraction profile along the optical axis and significantly increase the DOF and intensity of the focal spot, both of which will improve the imaging performance. The following examples achieve longer DOF and higher integrated intensity by appropriately setting the $C_m$ based on reducing the error $E_{mean}$. Other merit functions that are indicative of the focusing produced by the multi-focal lens may also be used, for example, Strehl ratio and/or modulation transfer function (MTF).

Bi-Focal Transmissive Advanced Diffractive Lens

Consider first a bi-focal ADL. The multiplexed phase for the ADL is:

$$\phi(x,y)=A_1(x,y)\times(\varphi_1+C_1)+A_2(x,y)\times(\varphi_2+C_2) \quad (5)$$

And the phase errors are defined as:

$$E_1(x,y)=|\phi(x,y)-(\varphi_1(x,y)+C_1)|$$

$$E_2(x,y)=|\phi(x,y)-(\varphi_2(x,y)+C_2)|$$

$$E=E_1+E_2$$

$$E_{mean}=\text{mean}(|\phi-(\varphi_1+C_1)|+|\phi-(\varphi_2+C_2)|) \quad (6)$$

Here, $A_1(x, y)$ and $A_2(x, y)$ are binary matrices, $C_1$ and $C_2$ are constant phase offsets which are adjusted from $-\pi$ to $\pi$ to minimize the error $E_{mean}$ and expand the DOF. Without loss of generality, we can set $C_2=0$.

Figure 2A:
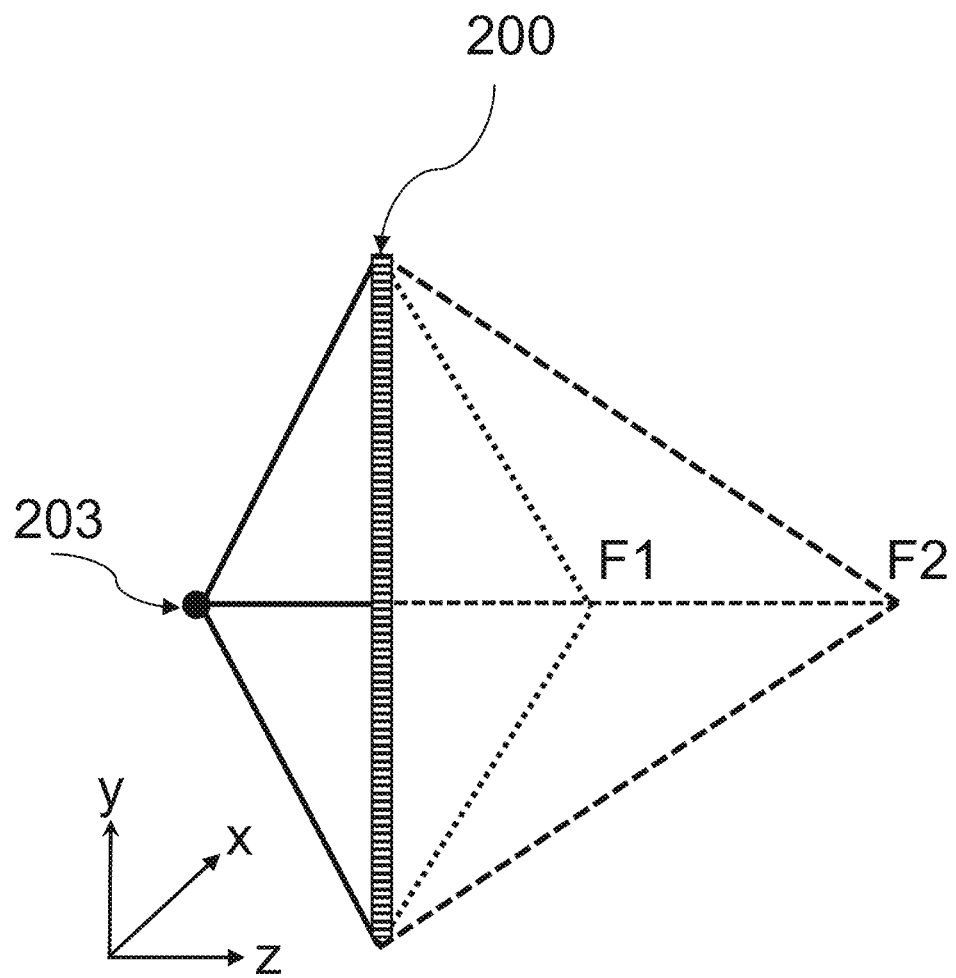
FIG. 2A is a side view of a bi-focal advanced diffractive lens.

FIGS. 2A-F illustrate the bi-focal ADL case with extended DOF. As shown in FIG. 2A, the ADL 200 focuses the light from point source 203 into two focal spots $F_1$ and $F_2$ with focal lengths of 1.5 mm and 2 mm, respectively. Here we are multiplexing the two required phases. The ADL has the super cell/unit cell structure of FIG. 1B. The super cell has two unit cells. Each unit cell is designed to focus light to the corresponding focal spot: one unit cell (unit cell #1) to $F_1$ and the other unit cell #2 to $F_2$. The error arises from the unit cell that is not designed for the other focal spot. For example, unit cell #1 is designed to focus the light into $F_1$. Therefore, it will not necessarily satisfy the required phase to focus the light into $F_2$. The difference between the phase of unit cell #1 and the required phase to focus the light into $F_2$ results in the phase error.

Figure 2B:
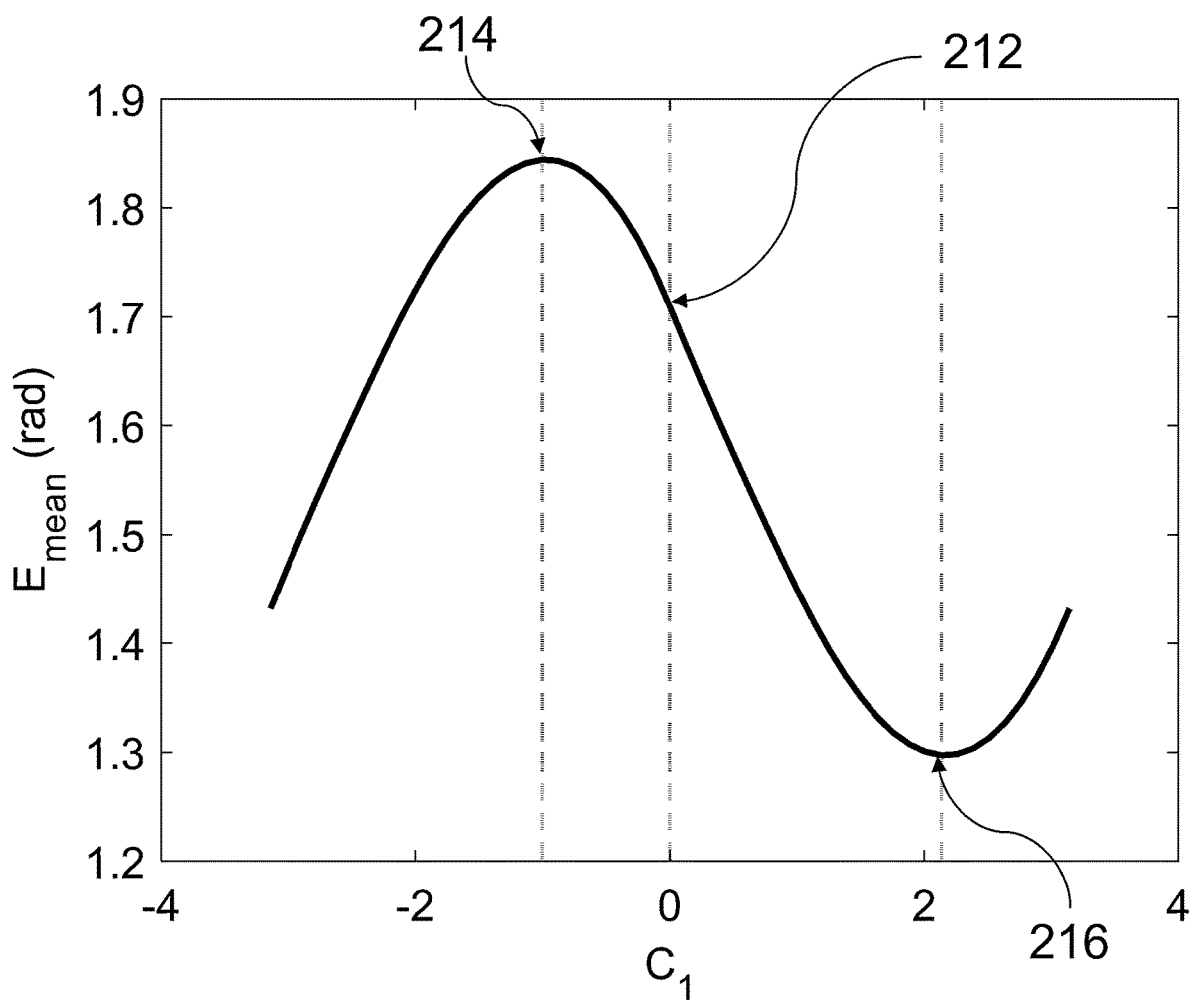
FIG. 2B is a plot of the phase error $E_{mean}$ as a function of the phase offset $C_1$.

FIG. 2B is a plot of the phase error $E_{mean}$ as a function of the phase offset $C_1$. It shows one can control $E_{mean}$ by adjusting the phase offset $C_1$. We calculate the required phase for the bi-focal ADL 200 using Eq. 1 for both focal spots, and then calculate $E_{mean}$ as a function of $C_1$. Point 212 is the situation when no phase offset is introduced, so $0=0$. This results in significant phase error. Point 214 is the point of maximum phase error, and point 216 is the point of minimum phase error. As shown in FIG. 2B, one can minimize the error $E_{mean}$ by setting the phase offset $C_1$ to 2.136 at point 216.

Figure 2C:
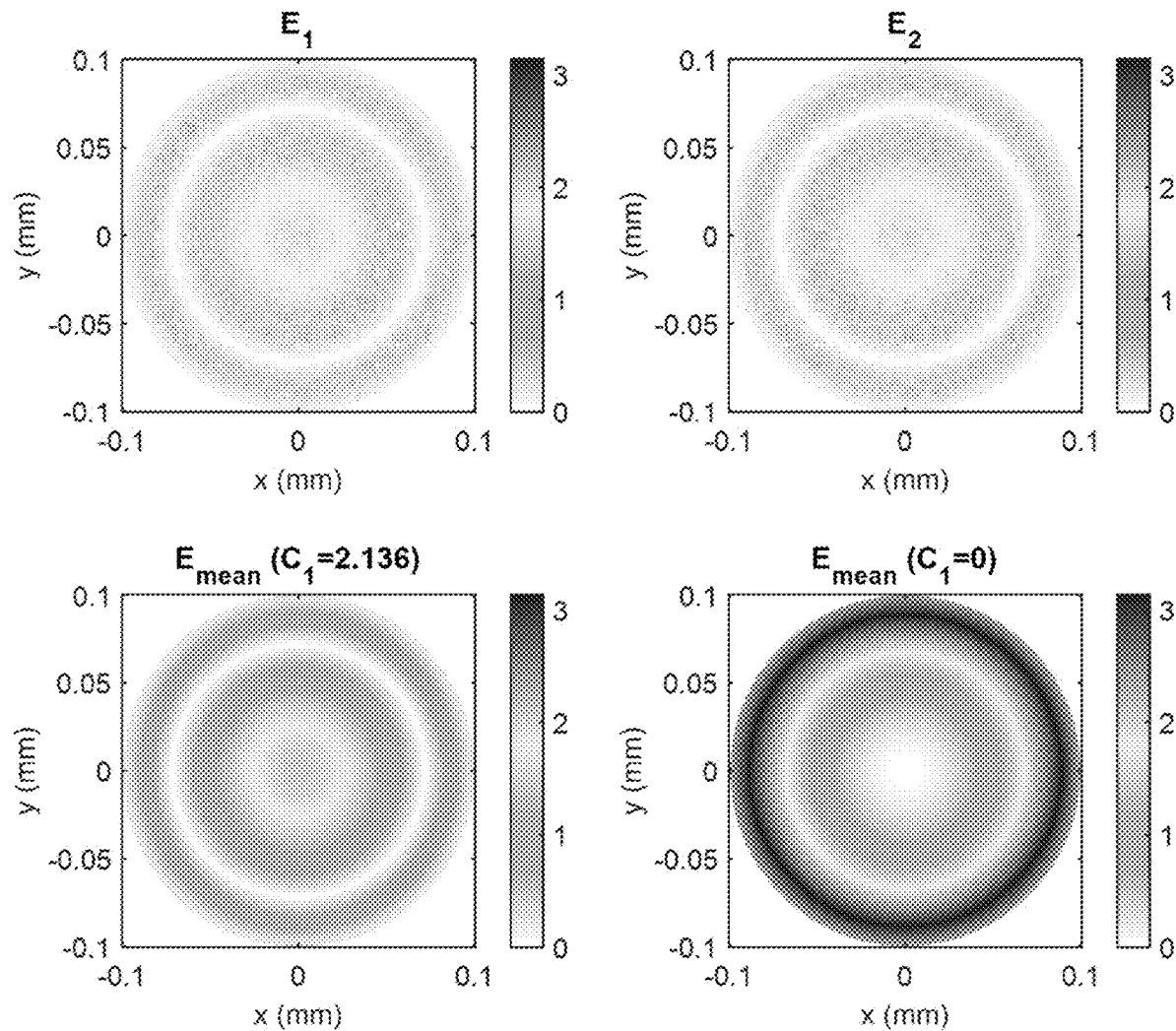
FIG. 2C are two-dimensional maps of phase error, for phase offset $C_1$ with minimum phase error.

FIG. 2C are two-dimensional maps of phase error. FIG. 2C (top-left) and FIG. 2C (top-right) show phase error maps, $E_1$ and $E_2$, respectively, of the ADL 200 with $C_1=2.136$. This is point 216 in FIG. 2B, which is the value of $C_1$ with minimum phase error. The checkerboard pattern is a result of the spatial multiplexing. The phase error $E_m$ for unit cell m is zero. Phase error is non-zero only for the other unit cells. In this example, M=2, resulting in the checkerboard pattern. The map of mean value of total errors ($E_{mean}$) are shown for $C_1=2.136$ (minimized phase error) and $C_1=0$ (no phase correction, shown as reference) in FIG. 2C (bottom-left) and FIG. 2C (bottom-right), respectively.

Figure 2D:
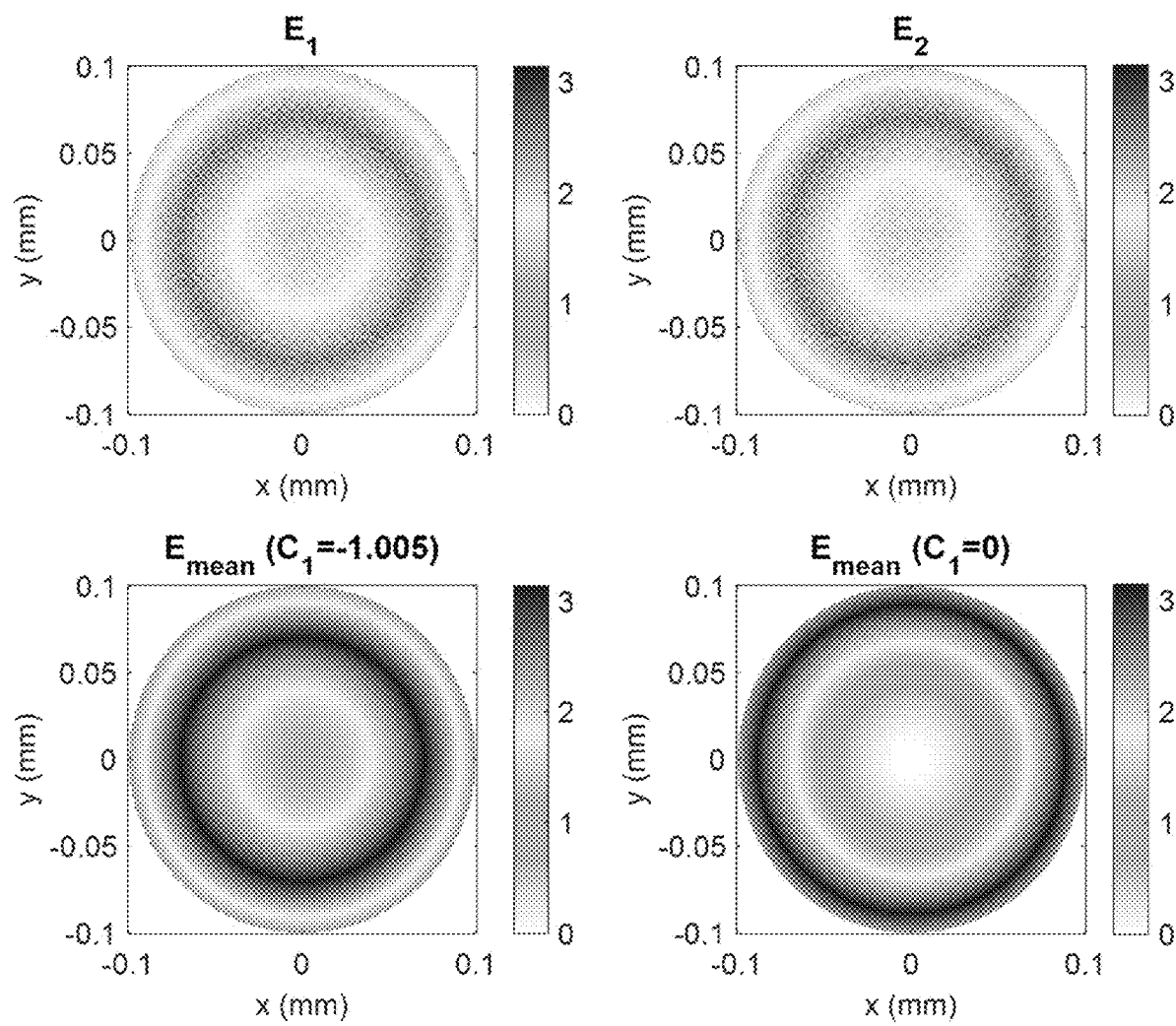
FIG. 2D are two-dimensional maps of phase error, for phase offset $C_1$ with maximum phase error.

FIG. 2D shows the same phase maps, but for $C_1=-1.005$ (point 214 in FIG. 2B). This is the value of $C_1$ which results in maximum $E_{mean}$. By appropriately adjusting the constant $C_1=2.136$, we reduce the mean phase error ($E_{mean}$). There is a significant difference between the phase error maps of FIG. 2C (bottom-left) and FIG. 2D (bottom-left).

Figure 2E:
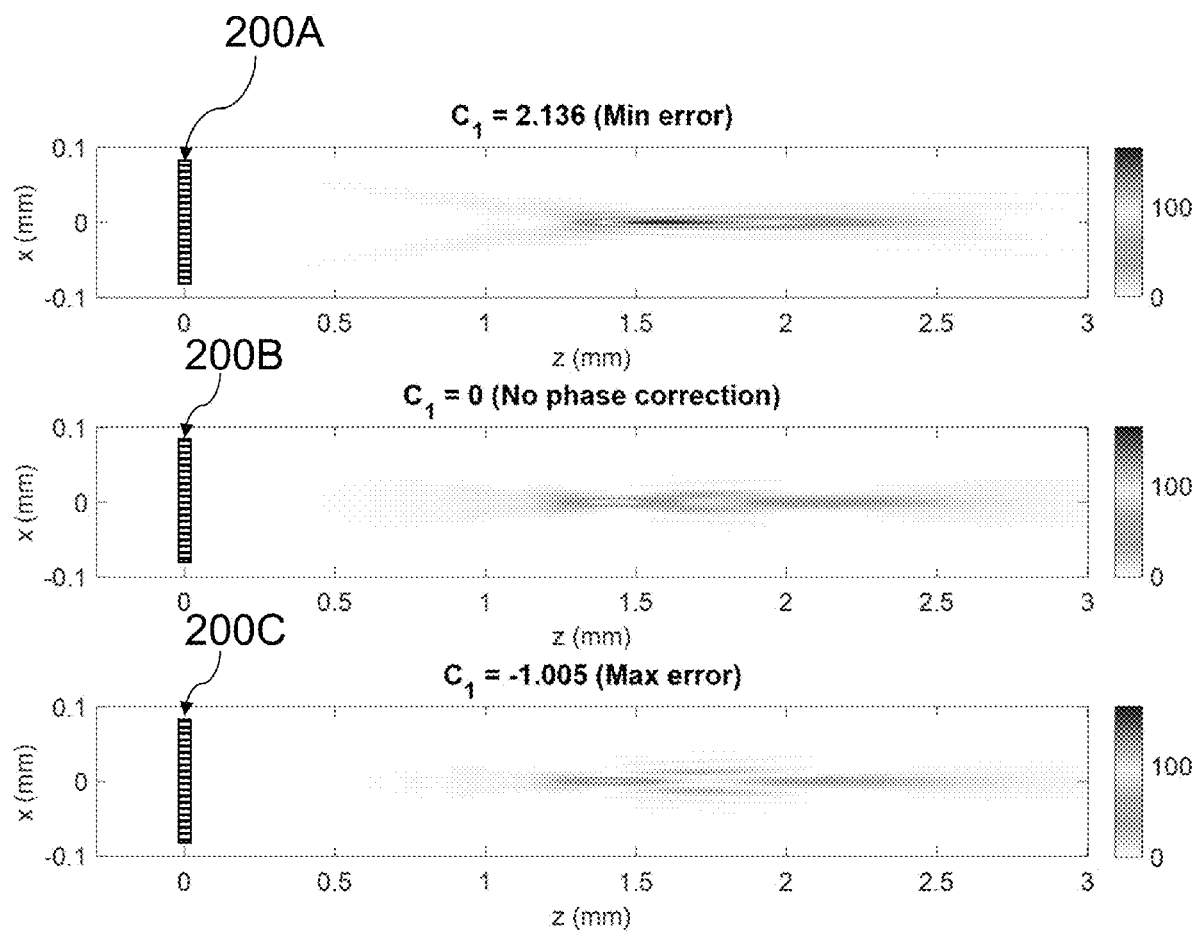
FIG. 2E are two-dimensional intensity maps, for different phase offsets $C_1$.

To further evaluate the effectiveness of this phase correction method, we calculate the point spread function (using scalar diffraction theory) of the ADL with different values of $C_1$. FIG. 2E shows the point spread function of ADL 200A, ADL 200B, and ADL 200C with different phase offsets of $C_1$ equal to 2.136, 0, and $-1.005$, respectively, corresponding to the minimum $E_{mean}=1.29$, no phase correction ($E_{mean}=171$), and maximum $E_{mean}=1.844$. DOF with minimum $E_{mean}$ (FIG. 2E (top)) shows an enhanced intensity and continuous field distribution along the optical axis. The DOF for the other phase offsets are much worse.

Figure 2F:
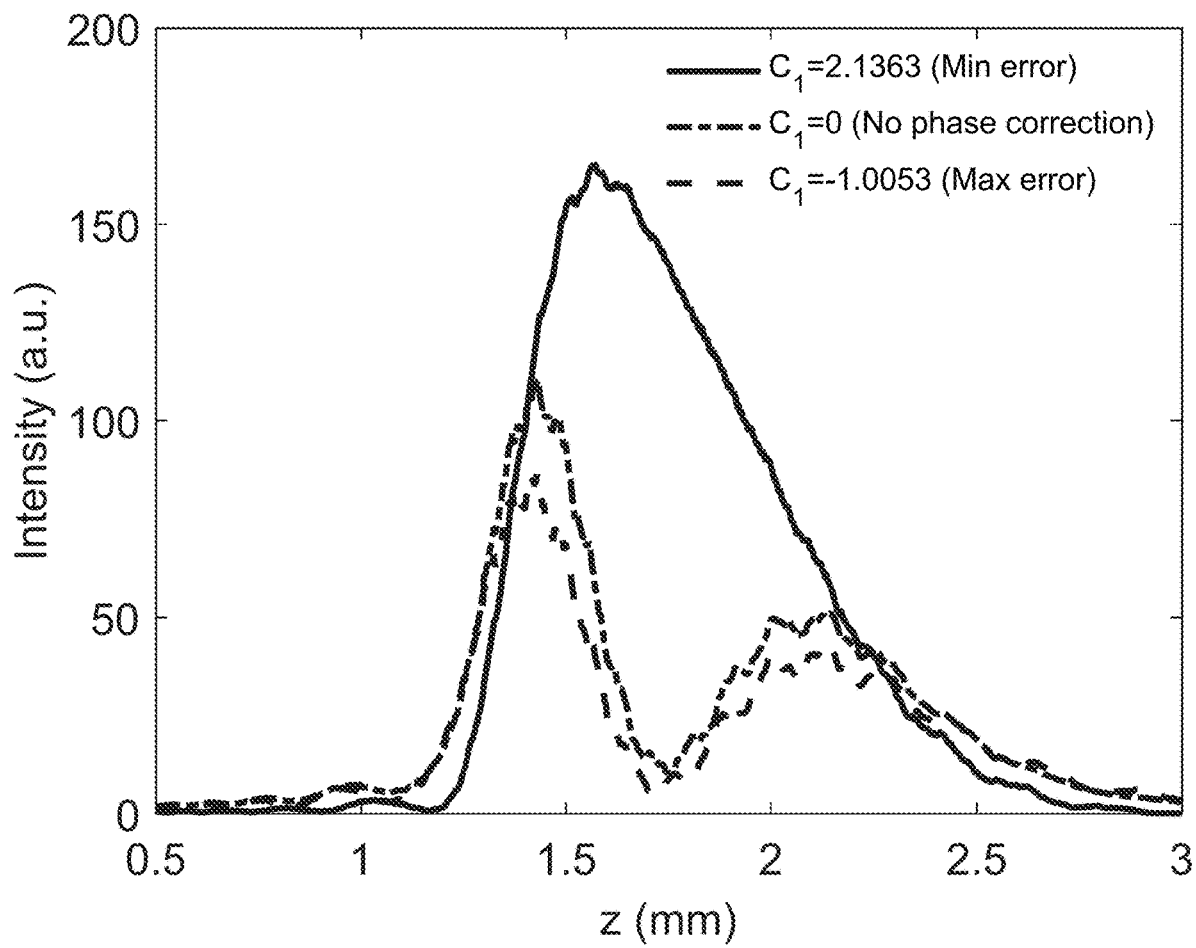
FIG. 2F are plots of intensity as a function of axial location z, for different phase offsets $C_1$.

FIG. 2F plots the intensity along the z-axis at $(x,y)=(0,0)$ for the same phase offsets shown in FIG. 2E. As shown in FIG. 2F, for the optimized ADL 200A which minimizes $E_{mean}$, ($C_1=2.136$). the highest intensity increases by 1.5 times, and DOF increases by 3.9 times compared to the case of no phase correction case ($C_1=0$).

Figure 2G:
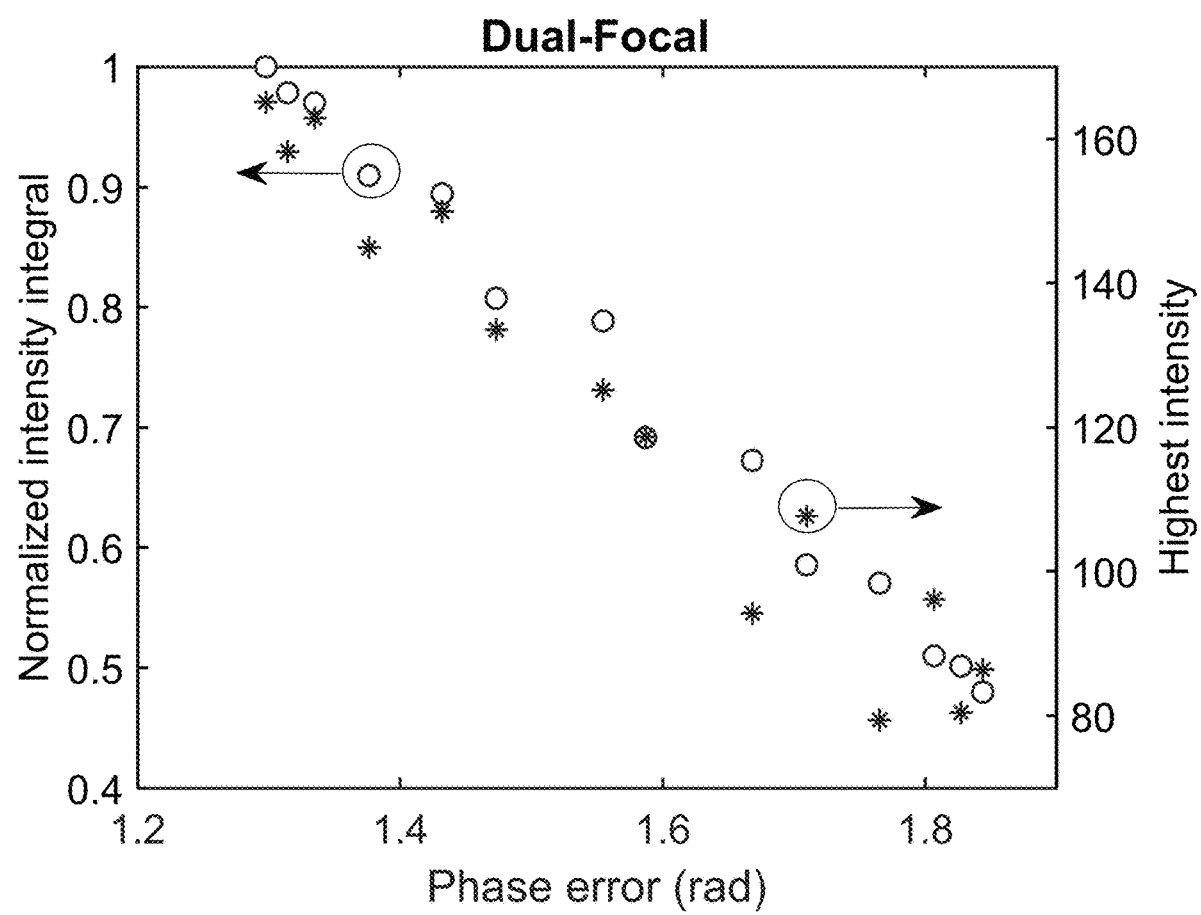
FIG. 2G are plots of normalized intensity integral and highest intensity as a function of phase error.

To better understand how the phase error contributes to the DOF, we calculate the relation between light distribution along the z-axis (x=0) and the phase error. FIG. 2G plots various intensity measures as a function of the phase error, for different values of the phase offset $C_1$. The left-y-axis is normalized intensity integral along the z-axis, which is plotted using the circles. This intensity metric is indicative of the expansion of the DOF along the propagation direction. The right-y-axis is the highest intensity along the z-axis, which is plotted using the stars. This intensity metric is indicative of the confinement of the focus along the main axis. Minimizing the phase error can increase the normalized intensity integral by 50% and enhance the highest intensity by a factor of two compared to the maximum phase error.

Tri-Focal Transmissive Advanced Diffractive Lens

For a tri-focal design, the spatially multiplexed phase for the ADL is:

$$\phi(x,y)=A_1(x,y)\times(\varphi_1+C_1)+A_2(x,y)\times(\varphi_2+C_2)+A_3(x,y)\times(\varphi_3+C_3) \quad (7)$$

Here A1, A2 and A3 are binary matrices, and $C_1$ and $C_3$ can be adjusted from $-\pi$ to $\pi$ independently. Here, for simplicity we consider $C_2=0$. $\varphi_1$, $\varphi_2$, $\varphi_3$ are assigned with focal length following $f_1<f_2<f_3$. In this case, since we care most about the continuity of the DOF, only the phase error between the two adjacent focuses is considered. That is, we consider phase mismatch error only between $\varphi_1$ and $\varphi_2$, and $\varphi_2$ and $\varphi_3$ (without $\varphi_1$ and $\varphi_3$). Therefore, we can break the phase error into two parts, and optimize the phase offsets $C_1$ and $C_3$ independently.

$$E_{mean,1}=\text{mean}(|\phi-(\varphi_1+C1)|+|\phi-\varphi_2|)$$

$$E_{mean,2}=\text{mean}(|\phi-\varphi_2|+|\phi-(\varphi_3+C_3)|) \quad (8)$$

By properly adjusting $C_1(C_3)$, we can minimize $E_{mean,1}$ ($E_{mean,2}$), and optimize DOF between $f_1$ and $f_2$ ($f_2$ and $f_3$).

Figure 3A:
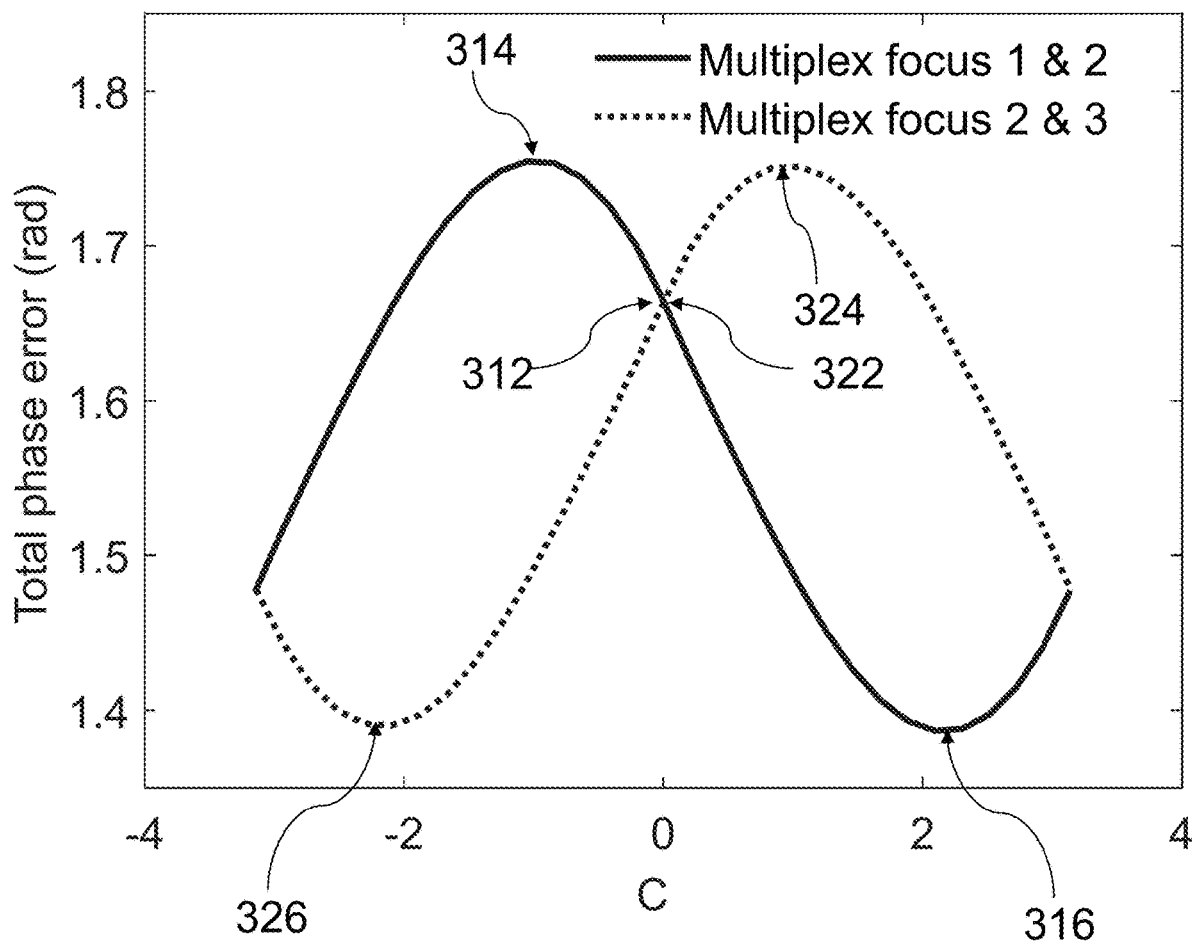
FIG. 3A are plots of the phase error $E_{mean}$ as a function of the phase offsets $C_1$ and $C_3$.

FIGS. 3A-D illustrate a tri-focal ADL design ($f_1=1.2$ mm, $f_2=1.5$ mm, and $f_3=2.0$ mm), where we are minimizing the phase error of both $f_1$ & $f_2$ and $f_2$ & $f_3$. FIG. 3A are plots of the mean value of total phase error ($E_{mean}$) as a function of C (either $C_1$ or $C_3$). The solid curve is the plot of phase error $E_{mean,1}$ as a function of $C_1$. Points 312, 314, 316 are the points of no phase offset, maximum phase error, and minimum phase error, respectively. The dotted curve is the plot of phase error $E_{mean,2}$ as a function of $C_3$. Points 322, 324, 326 are the points of no phase offset, maximum phase error, and minimum phase error, respectively.

Figure 3B:
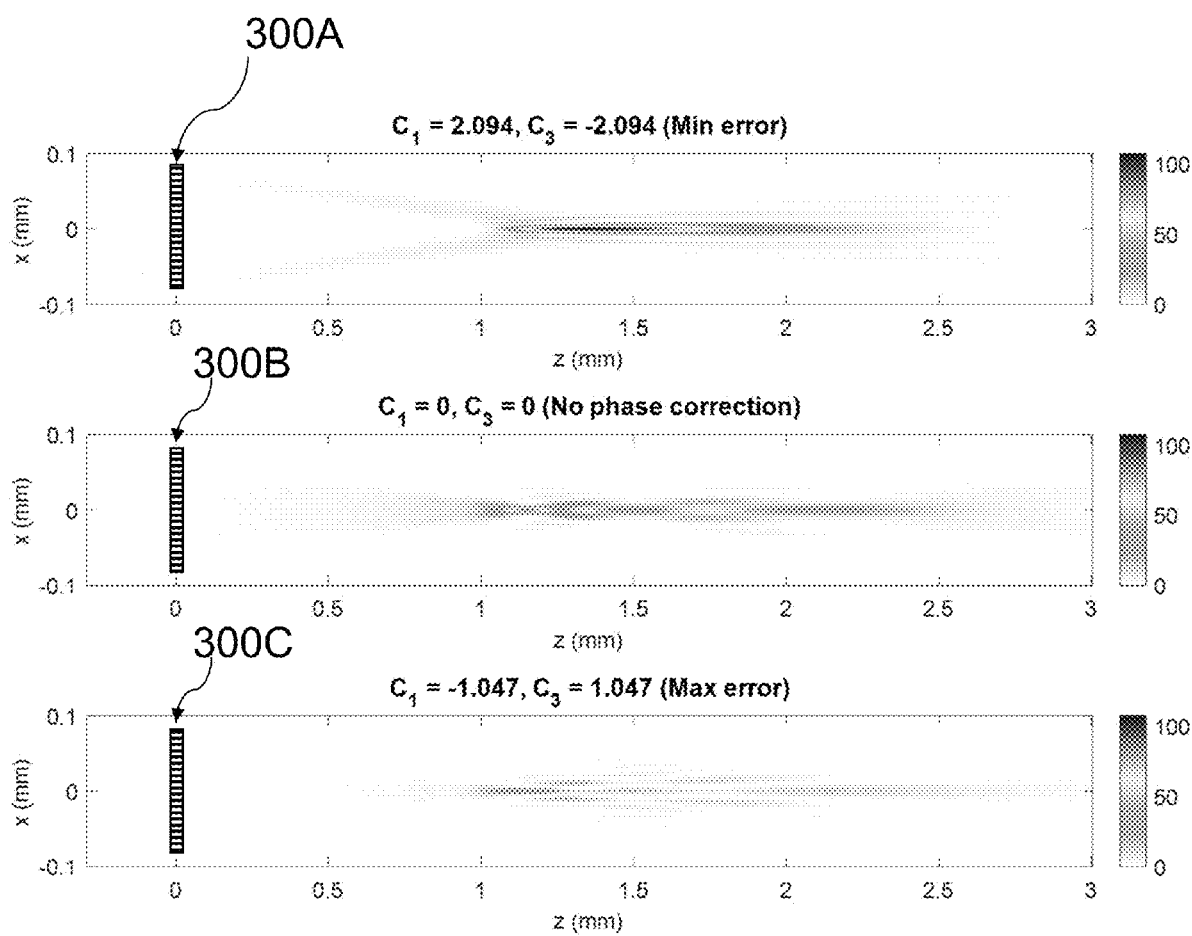
FIG. 3B are two-dimensional intensity maps, for different phase offsets $C_1$ and $C_3$.

FIG. 3B are two-dimensional intensity maps, showing point spread functions of ADL 300A, ADL 300B and ADL 300C with minimum $E_{mean}$, no phase correction, and maximum $E_{mean}$, respectively. Here, minimum $E_{mean}$ is both minimum $E_{mean,1}$ and minimum $E_{mean,2}$ Point spread function of ADL 300A with minimum $E_{mean}$ (FIG. 3B (top)) shows an enhanced intensity and continuous field distribution (longer DOF) along the optical axis compared to the other cases (FIG. 3B (middle) and FIG. 3B (bottom)). As shown for the optimized ADL 300A, with minimized $E_{mean}$, the DOF increases by approximately 4 times compared to the no-phase correction case ($C_1=C_3=0$).

Figure 3C:
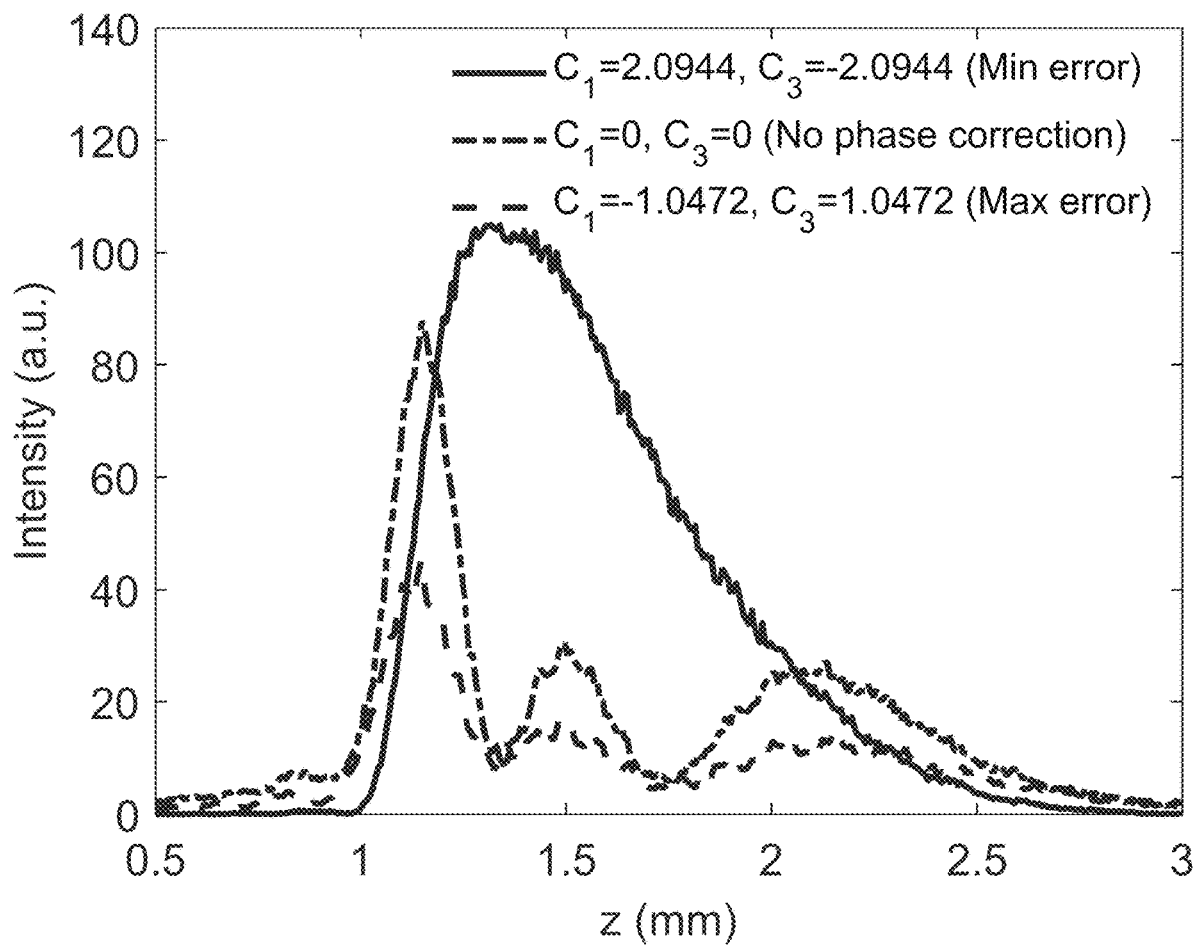
FIG. 3C are plots of intensity as a function of axial location z, for different phase offsets $C_1$ and $C_3$.

FIG. 3C plots the intensity along the z-axis at $(x, y)=(0, 0)$ for the same cases as shown in FIG. 3B. This highlights that by minimizing the phase error, one can both extend the DOF and increase the maximum intensity.

Figure 3D:
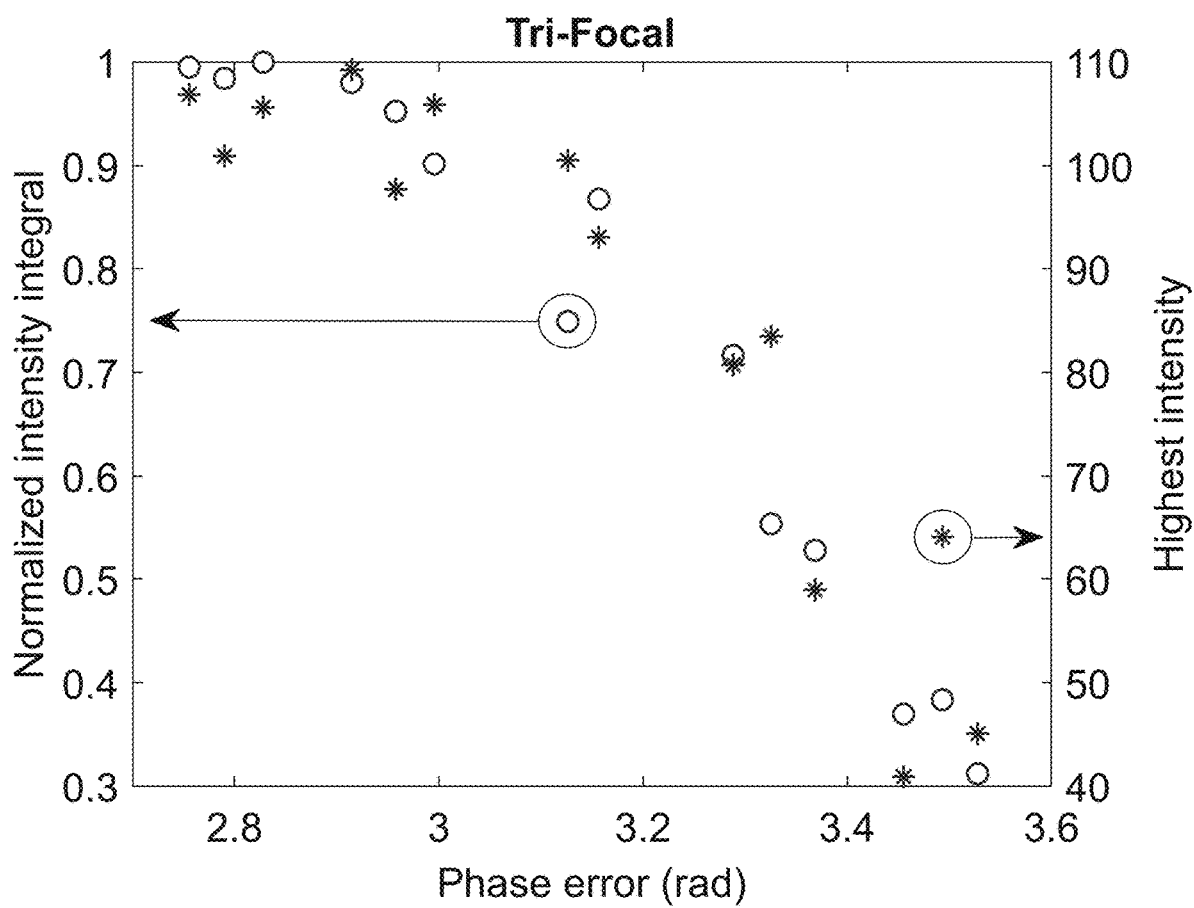
FIG. 3D are plots of normalized intensity integral and highest intensity as a function of phase error.

To better understand how the phase error contributes to the DOF, we calculate the relation between light distribution along the z-axis (x=0) and the phase error ($E_{mean,1}+E_{mean,2}$), as shown in FIG. 3D. The left-y-axis is normalized intensity integral along the z-axis, which is plotted using the circles. The right-y-axis is the highest intensity along the z-axis, which is plotted using the stars. Minimizing the phase error can increase the normalized intensity integral by 3.33 times and enhance the highest intensity by a factor of 2.7 compared to the case with maximum phase error.

So far we have demonstrated that in both the bi-focal and tri-focal cases, smaller phase errors result in more concentrated light along the main optical axis with higher maximum intensity and longer DOF. This method can also be extended to increase the number of focal spots to M>3. With focal length $f_1 < f_2 < f_3 < \ldots < f_M$, $$\phi(x, y) = \sum_{m=1}^{M} [(\varphi_m + C_m) \times A_m(x, y)] \quad (9)$$

$$E_{mean,m} = \text{mean}(|\phi - (\varphi_m + C_m)| + |\phi - \varphi_{m+1}|)$$

Here, we can minimize each $E_{mean,m}$ ($1 \le m \le M-1$) by optimizing each $C_m$ to get desired depth of focus. This approach considers only adjacent foci, in order to allow separate optimization of each phase offset $C_m$. Alternatively, we can consider more than just the adjacent foci and jointly optimize the phase offsets $C_m$.

Figure 4A:
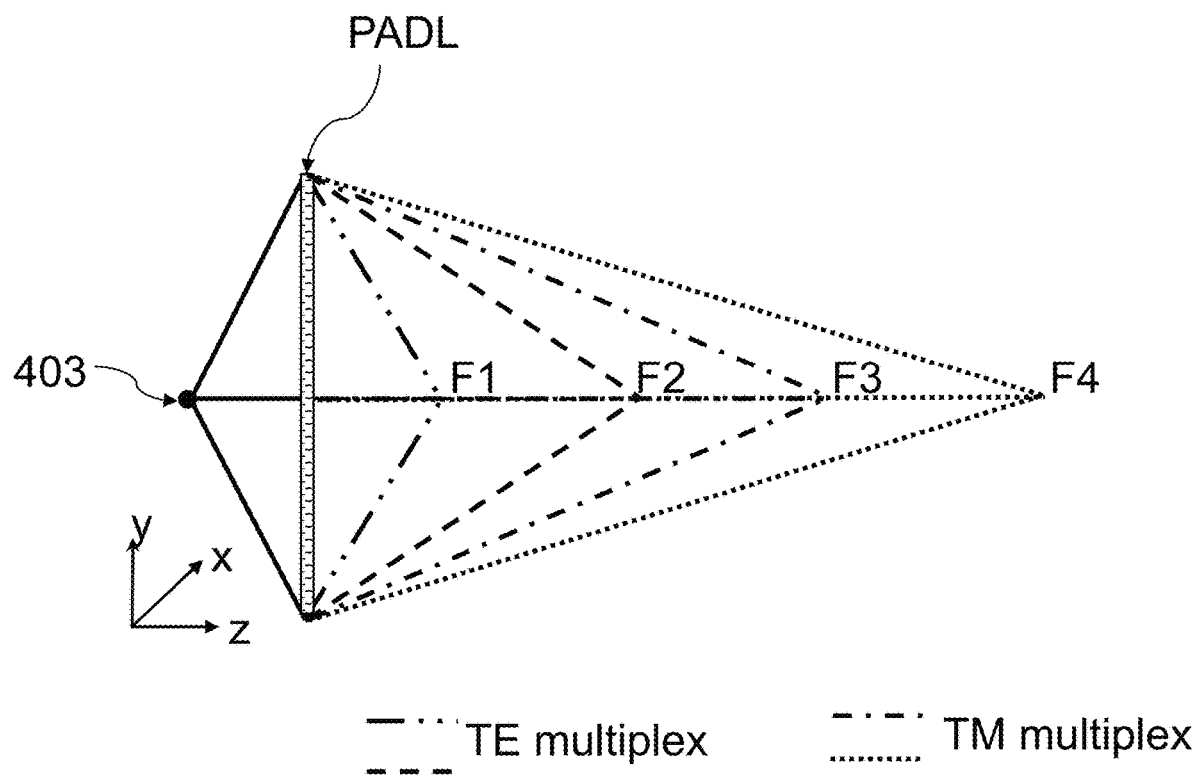
FIG. 4A is a side view of a quad-focal polarization-dependent advanced diffractive lens.

Quad-Focal Transmissive Advanced Diffractive Lens with Polarization Multiplexing Spatial multiplexing is one way to increase the number of focal spots in an ADL design. Other multiplexing techniques may be combined with spatial multiplexing. The following example shows a quad-focal Polarization-Dependent Advanced Diffractive Lens (PADL) design with an extended DOF using a combination of polarization multiplexing (two channels) and bi-focal spatial multiplexing (two channels). The schematic design of a quad-focal PADL is shown in FIG. 4A. When the input light is TE (TM) polarized, it has a spatially multiplexed phase distribution for $f_1$ and $f_2$ ($f_3$ and $f_4$). The spatially multiplexed phase for each polarization is:

$$\phi_{TE}(x,y) = A_1(x,y) \times (\varphi_1 + C_1) + A_2(x,y) \times \varphi_2$$

$$\phi_{TM}(x,y) = A_1(x,y) \times (\varphi_3 + C_2) + A_2(x,y) \times \varphi_4 \quad (10)$$

Here, $A_j(x, y)$ is a binary matrix that implements the spatial multiplexing. In this example, the TE focal length $f_1$ and the TM focal length $f_3$ share the same subapertures, as do the TE focal length $f_3$ and the TM focal length $f_4$. The phase offsets for focal spots $f_2$ and $f_4$ are set to zero. The remaining phase offsets $C_1$ and $C_2$ can be optimized independently to have minimum phase error. Since the diffracted light intensity from TE and TM are independent, we can simply add two intensities together when quantifying the light intensity at the propagation axis.

$$I_{tot} = |E_{TE}|^2 + |E_{TM}|^2 \quad (11)$$

Here, |E| is the amplitude of the light field, not the phase error. PADL design can be designed using polarization-dependent sub-wavelength phase shifters as unit cells with an independent TE-polarized and TM-polarized phase construction.

Figure 4B:
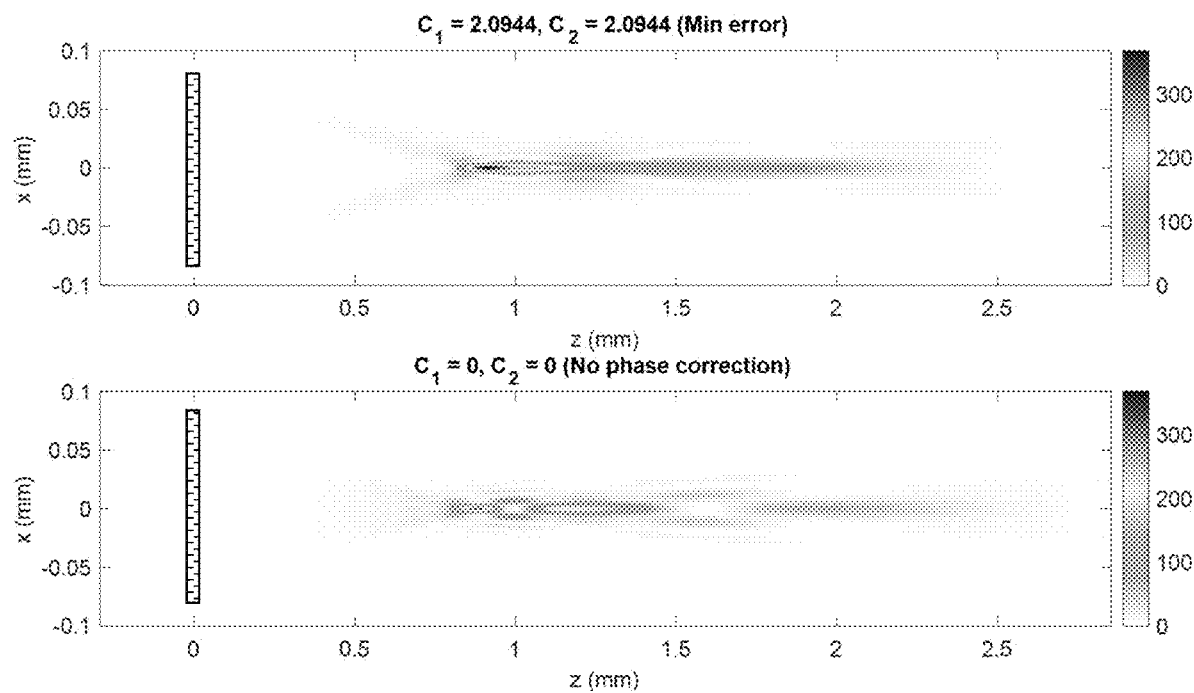
FIG. 4B are two-dimensional intensity maps, for different phase offsets $C_1$ and $C_2$.

FIG. 4B are two-dimensional intensity maps for the quad-focal PADL design. As shown in FIG. 4B (top) by optimizing the constant phase offsets ($C_1 = C_2 = 2.0944$) to minimize the phase error, we not only extend the DOF but also enhance the intensity compared to the case with no phase correction ($C_1 = C_2 = 0$) shown in FIG. 4B (bottom).

Figure 4C:
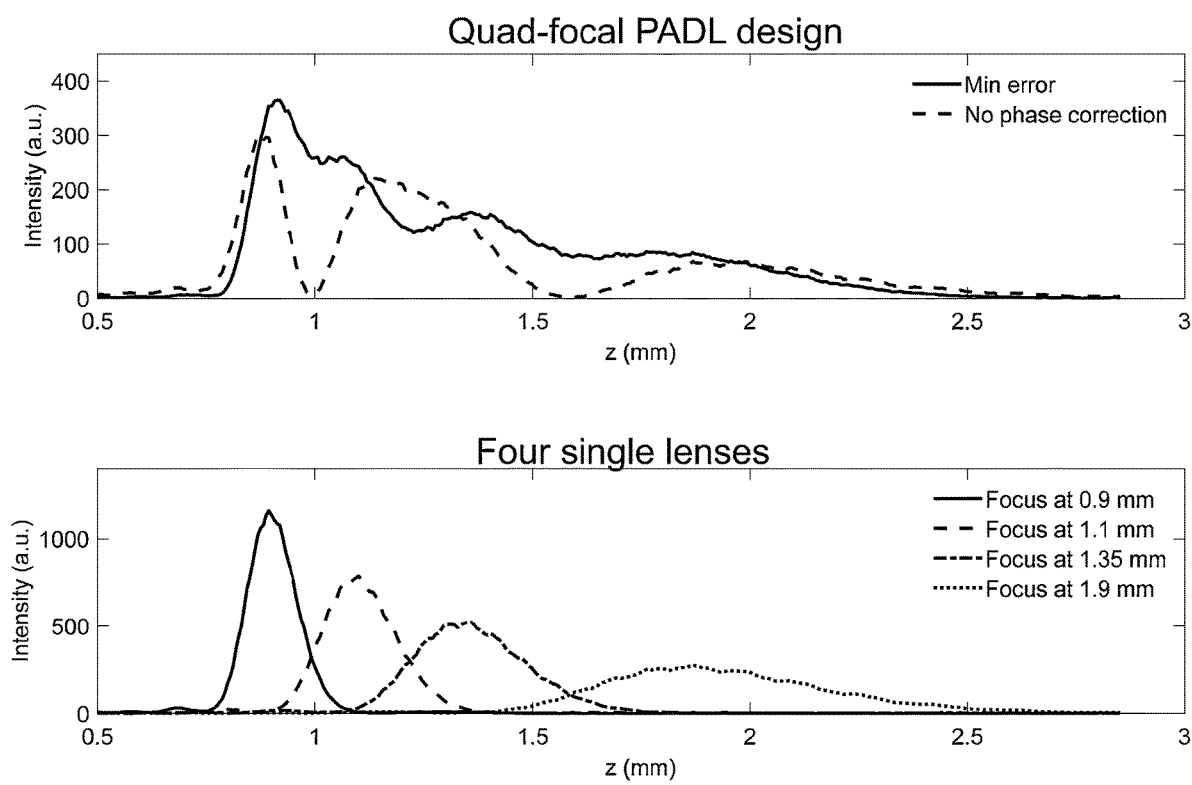
FIG. 4C are plots of intensity as a function of axial location z.

FIG. 4C shows the intensity distribution along the z-axis (x, y=0). FIG. 4C (top) is the intensity distribution for the quad-focal PADL. FIG. 4C (bottom) is the intensity distribution for four single-focal lenses with different focal lengths for comparison. Notably, DOF is expanded in the PADL case compared with the single-focal lens design. A single-focus lens has a limited DOF constrained by its numerical aperture.

Bi-Focal Reflective Advanced Diffractive Lens

Figure 5A:
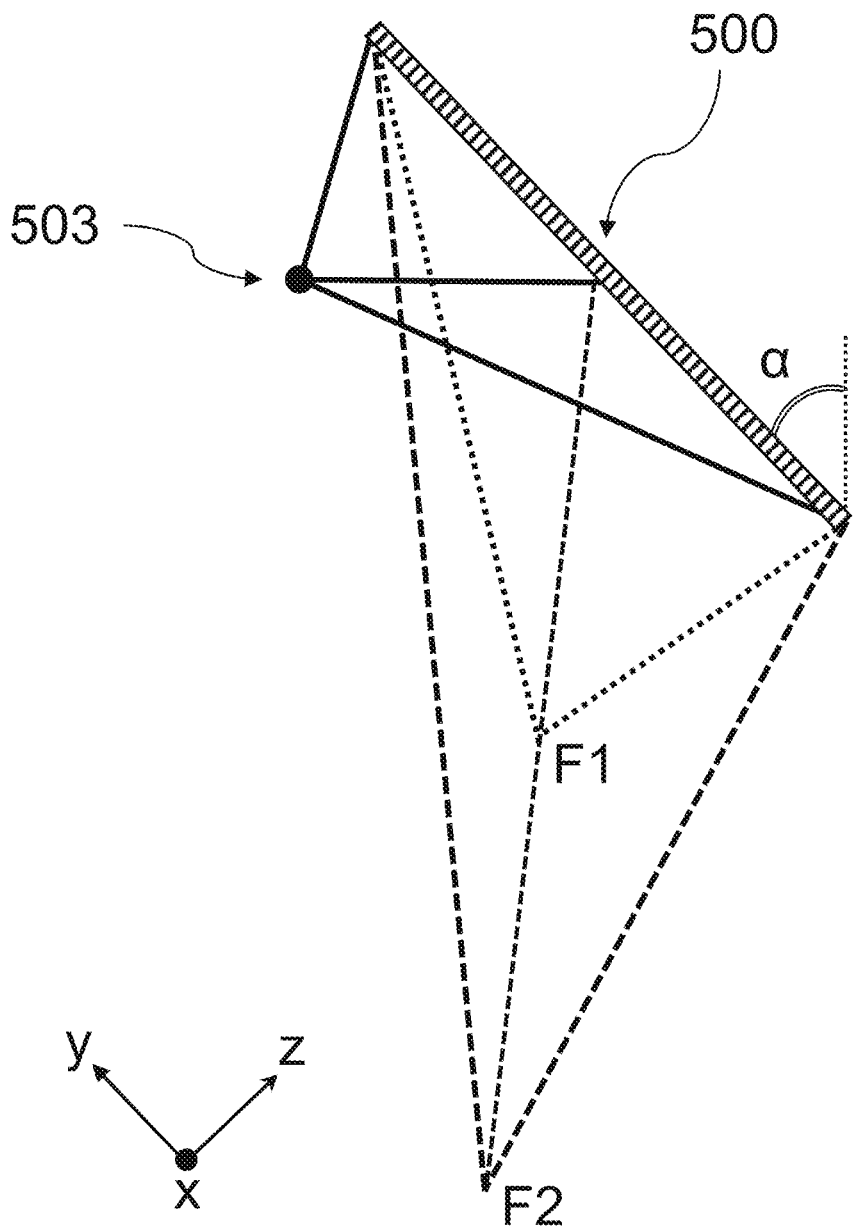
FIG. 5A is a side view of a reflective advanced diffractive lens.

As another example, in this section we designed an off-axis reflective ADL 500 as shown in FIG. 5A. Therefore, we need to plug in the position of point source 503 ($x_{ps}, y_{ps}, z_{ps}$) and the position of focal points ($x_{fm}, y_{fm}, z_{fm}$), as follows:

$$(x_{ps}, y_{ps}, z_{ps}) = (0, L \sin(\alpha), -L \cos(\alpha))$$

$$(x_{fm}, y_{fm}, z_{fm}) = (0, -f_m \sin(\alpha), -f_m \cos(\alpha)) \quad (12)$$

Here, L is the distance between the light point source 503 and the center of the ADL 500 (0, 0, 0), and a is the tilted angle of the ADL as shown in FIG. 5A. Here we consider $\alpha = 42.5°$ but it can be any value without changing the approach. After calculating the phase $\varphi_m$ for each focal point m, we follow the same approach as described above to optimize the ADL performance (extending the DOF and increasing the focusing intensity).

Figure 5B:
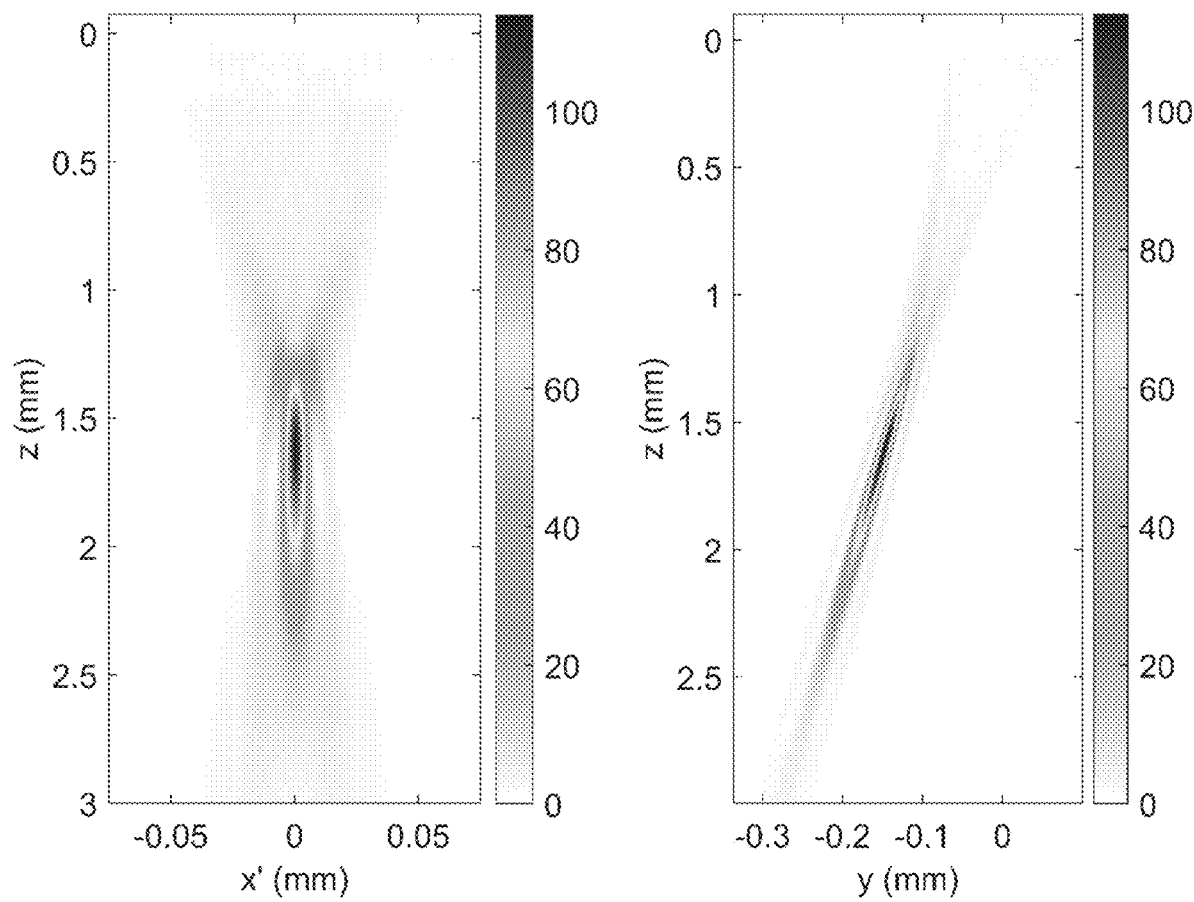
FIG. 5B are two-dimensional intensity maps, for minimum phase error.
Figure 5C:
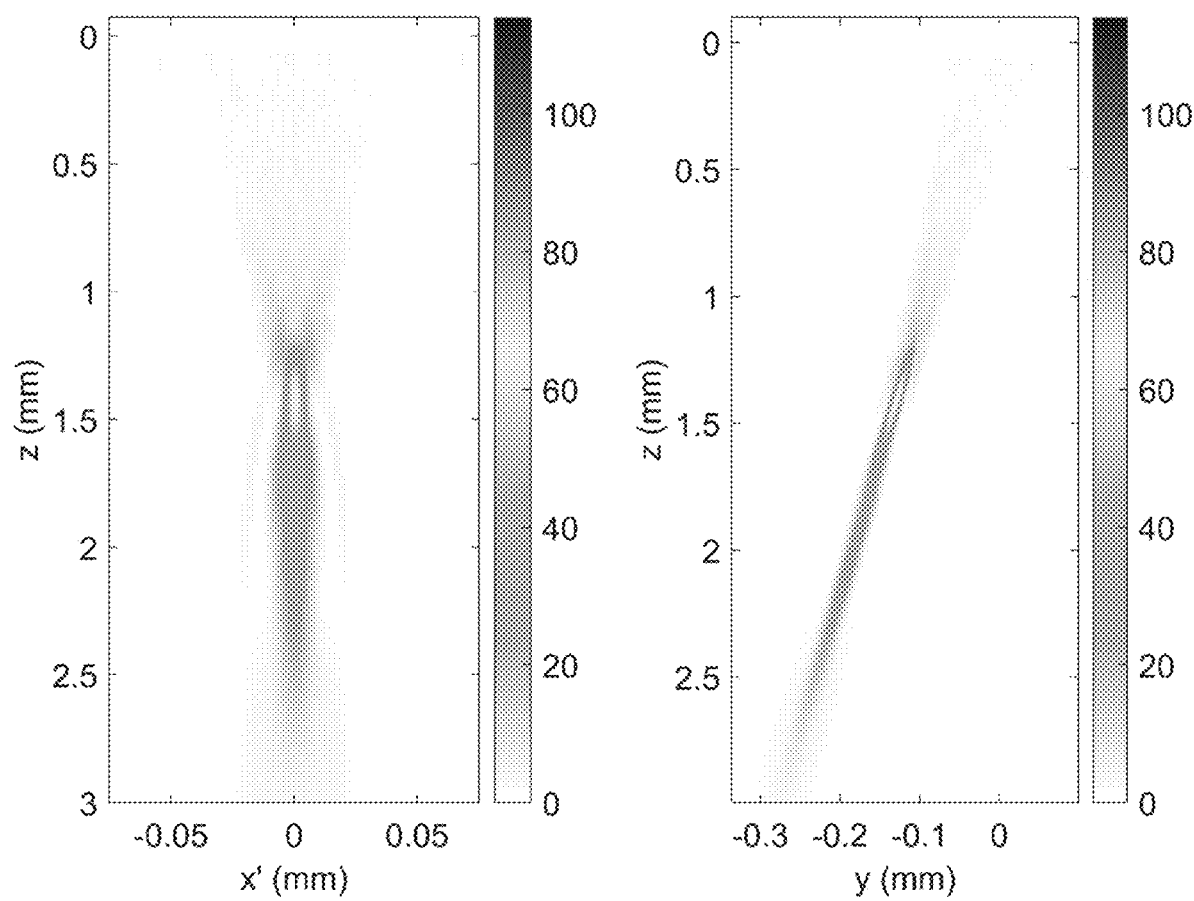
FIG. 5C are two-dimensional intensity maps, for no phase correction.

FIGS. 5B-C are two-dimensional intensity maps for a reflective bi-focal ADL ($f_1 = 1.5$ mm and $f_2 = 2$ mm). FIG. 5B shows the point spread function of ADL with minimized phase error in the x'z-plane (FIG. 5B (left)) and in the yz-plane (FIG. 5B (right)). Here the x'z-plane is the xz-plane that intersects the optical axis of ADL 500. Similarly, the point spread function of ADL with no phase correction is shown for the x'z-plane (FIG. 5C (left)) and the yz-plane (FIG. 5C (right)). Comparing FIG. 5B and FIG. 5C, the phase correction approach increases the DOF by 2.4 times and increases the highest intensity by 72%.

Quad-Focal Transmissive Advanced Diffractive Lens Enclosed by Flexible Tube

Figure 6A:
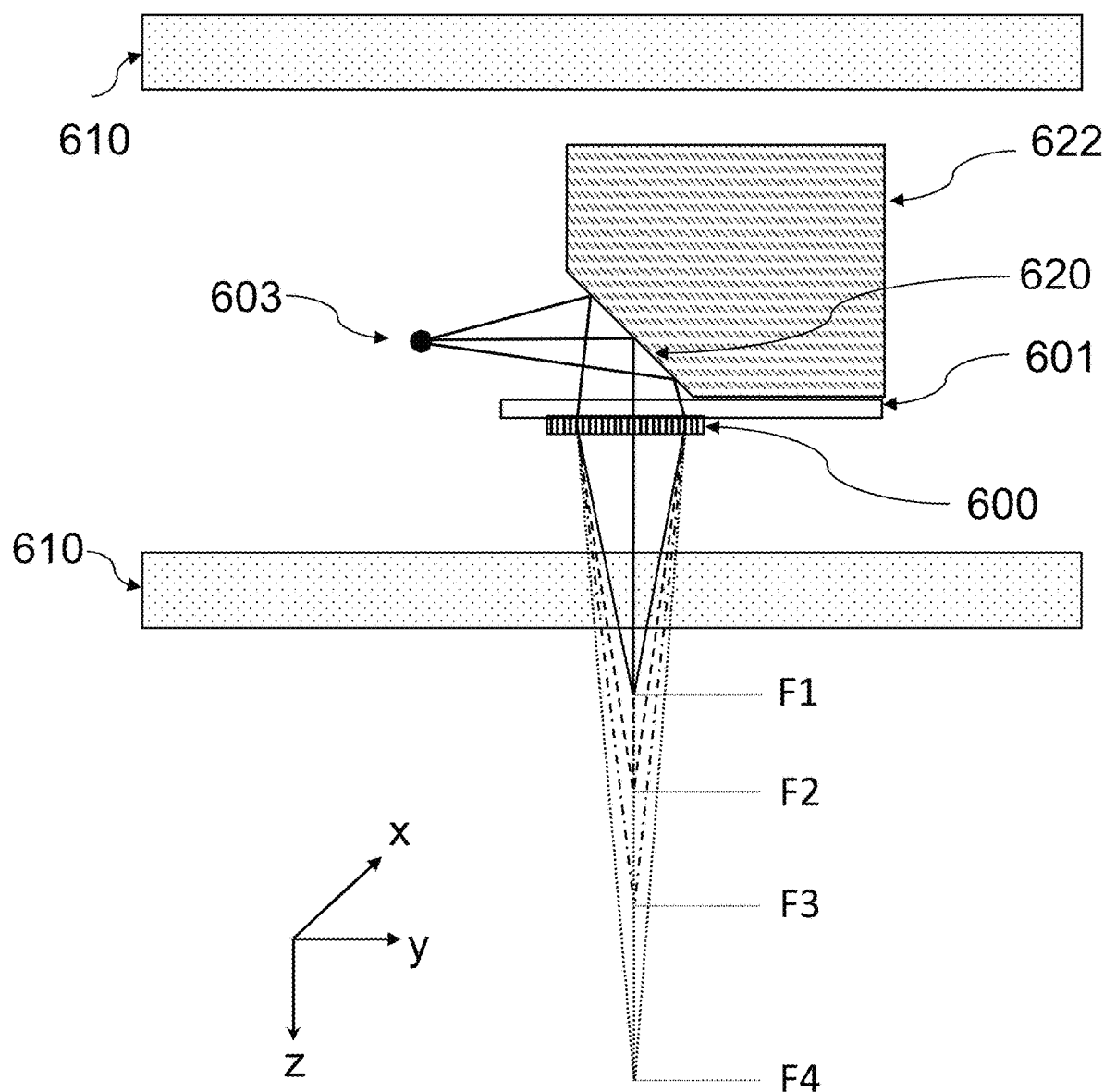
FIG. 6A is a side view of an advanced diffractive lens in a housing.

An imaging system may be enclosed by a housing to keep it clean or in medical applications to avoid contacting the tissue. FIG. 6A shows an ADL 600 positioned inside a housing 610, such as a plastic tube. The tube is cylindrical in shape. FIG. 6A shows a cross-section. The top and bottom rectangles in FIG. 6A are the walls of the cylinder. A mirror 620 reflects the light (received from the point source 603) toward ADL 600. So here ADL 600 focuses the light in the radial direction. The mirror itself is mounted on a holder 622. The ADL 600 and substrate 601 are also mounted to the holder 622. The quad-focal ADL 600 has four focuses ($F_1$-$F_4$) with the working distance of 0.4 mm, 0.6 mm, 1 mm, and 1.5 mm, respectively. Working distance is defined as the distance from the focal spot to the outer surface of plastic tube (the outer surface of the tube faces toward the focal spots).

Figure 6B:
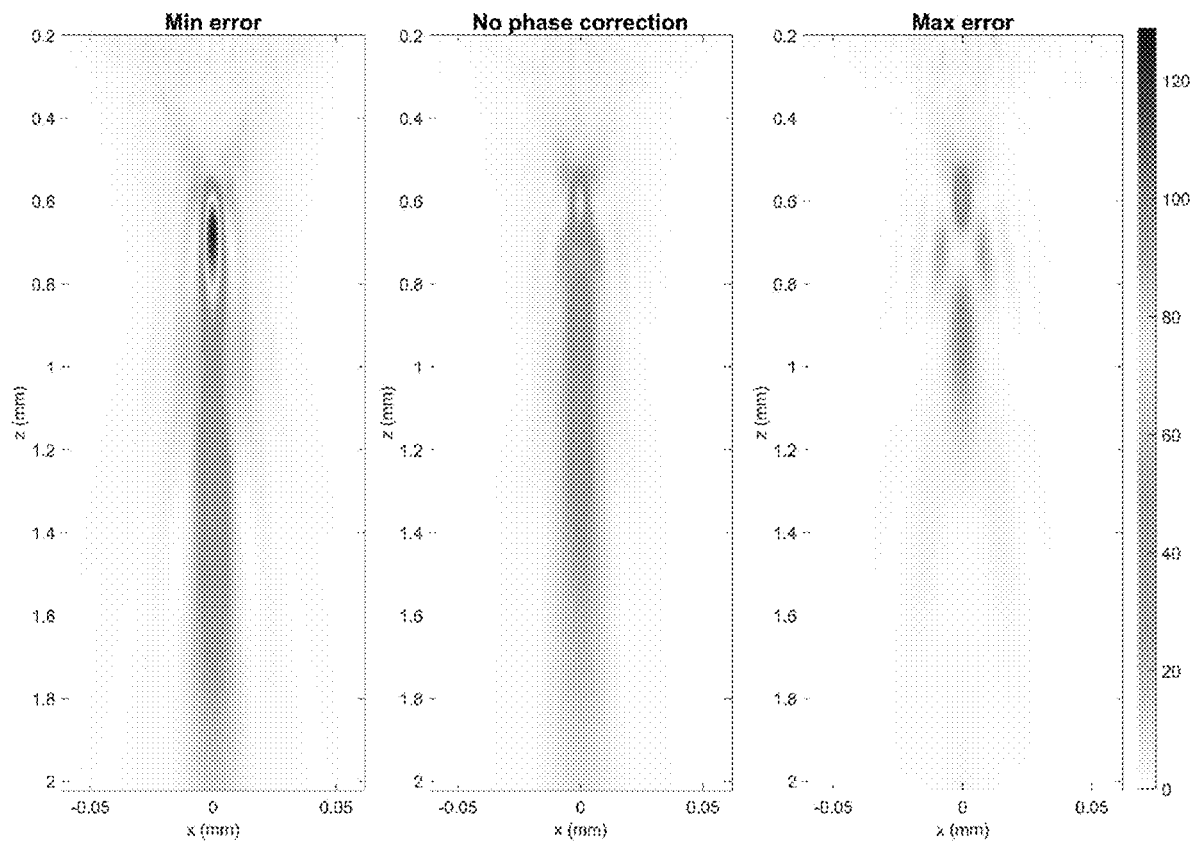
FIG. 6B are two-dimensional intensity maps, for different phase offsets.

FIG. 6B shows the point spread function of three ADL designs where the phase error is minimum (FIG. 6B (left)), no phase correction is made (FIG. 6B (middle)) and phase error is maximum (FIG. 6B (right)). By minimizing the phase error, we could increase the DOF by a factor of 3.5 times compared to the case where there was no phase correction.

Figure 7:
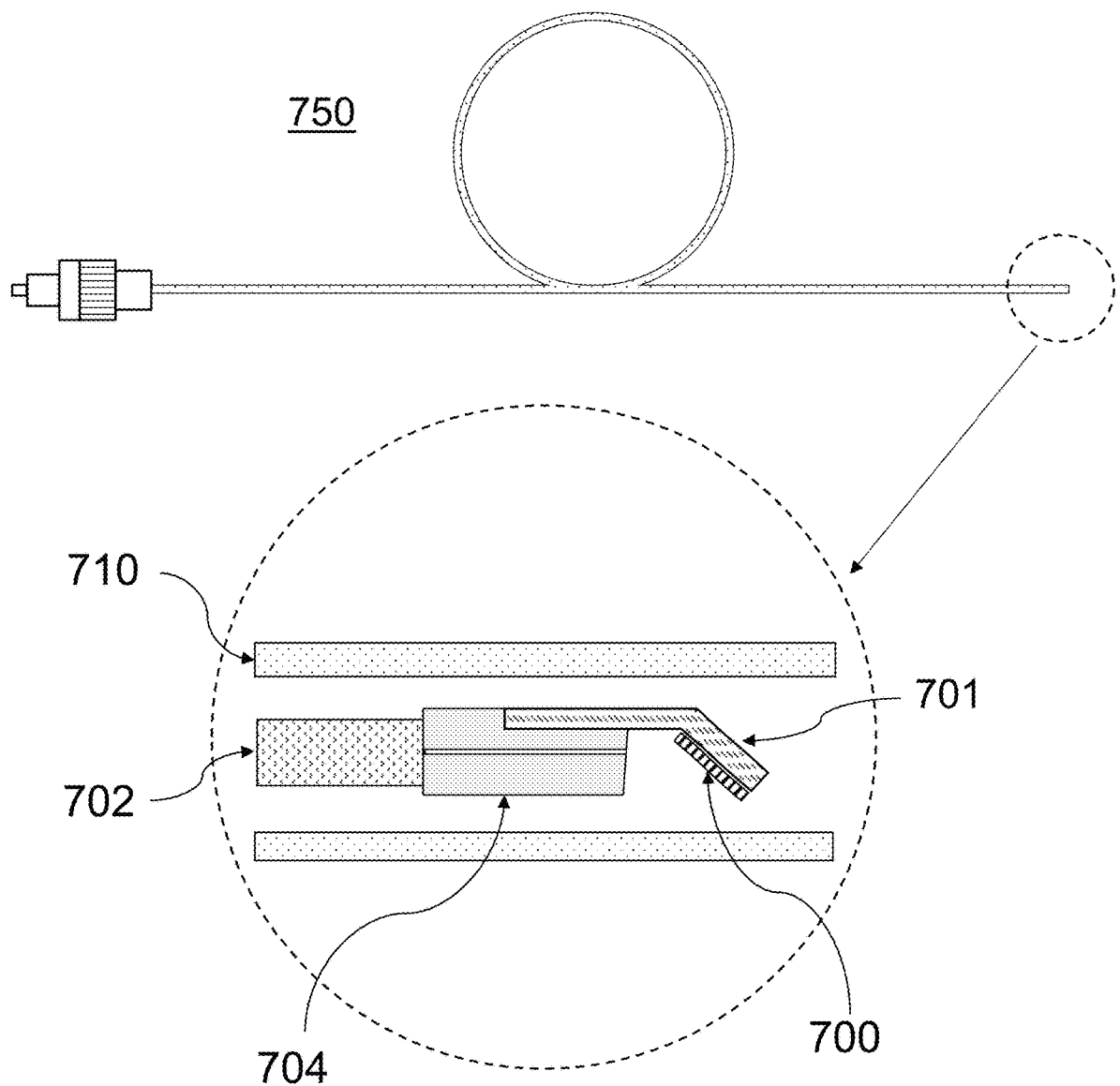
FIG. 7 shows use of an advanced diffractive lens in an endoscopic probe.

FIG. 7 shows one example of how an ADL can be used to build an endoscopic probe 750. FIG. 7 shows a cross-section of the tip region of the probe. The outer portion 710 includes a tube. Inside the probe, a fiber 702 is connected to a ferrule 704. An ADL 700 is attached to the ferrule by a holder 701.

The components are enclosed by the tube 710. The tube can be plastic, polymer, glass or any other flexible or rigid material.

Other examples of endoscope devices suitable for use with ADLs are described in U.S. patent application Ser. No. 18/269,709, "Methods and Systems for Multi-Functional Miniaturized Endoscopic Imaging and Illumination" filed Dec. 27, 2021; and PCT Patent Appl. No. PCT/US2022/029,301, "Methods and Apparatus for Reconfigurable Optical Endoscopic Catheter" filed May 13, 2022; both of which are incorporated by reference in their entirety.

Although the detailed description contains many specifics, these should not be construed as limiting the scope of the invention but merely as illustrating different examples. It should be appreciated that the scope of the disclosure includes other embodiments not discussed in detail above.

For example, embodiments may include two or more ADLs. In some cases, two ADLs provide extra degrees of freedom to reduce the phase error. ADLs can be vertically stacked with or without space between them. ADLs also can be cascaded with other optical components such as polarizers and color/spectral filters, to add extra functionality to the system such as polarization resolved imaging or hyperspectral imaging. ADLs also can be used with reflective lenses or other types of focusing components such as liquid crystals. Also, some device may use multiple fibers: one fiber to deliver the light to the scene (e.g., tissue) and another to collect the light from scene.

The phase correction concept described herein can be applied beyond lenses and focusing. For example, the spatially multiplexed optic may be designed for some other purpose or to achieve some other wavefront shaping. Examples including generating a Bessel beam. In such a case, the effects of the different subapertures in the spatially multiplexed optic may be modelled using complex amplitude profiles. This may include amplitude effects, in addition to phase effects. Adding constant phase offsets will not change the optical function of any individual subaperture, but may be used to control the interference between different subapertures.

Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method implemented on a computer system for designing a spatially multiplexed optic having two or more subapertures with corresponding optical functions, the method comprising:
   determining complex amplitude profiles for the subapertures, based on achieving the corresponding optical functions for the subapertures;
   selecting a merit function indicative of an optical performance of the spatially multiplexed optic; and
   adding a constant phase offset to one or more of the complex amplitude profiles, based on improving the merit function.

2. The method of claim 1, wherein:
   the spatially multiplexed optic is a multi-focal lens, and the subapertures of the multi-focal lens focus to different focal points;
   the complex amplitude profiles are phase profiles, and determining the phase profiles for the subapertures is based on focusing to the different focal points; and
   the merit function is indicative of a focusing produced by the multi-focal lens.

3. The method of claim 2, wherein the merit function includes a phase mismatch error between (a) a phase profile for focusing to the focal point for one of the subapertures, and (b) a phase profile produced by a different subaperture.

4. The method of claim 2, wherein the multi-focal lens has three or more subapertures that focus to different focal points, and the merit function includes phase mismatch errors only between subapertures for adjacent focal points.

5. The method of claim 2, wherein the multi-focal lens has M subapertures that focus to different focal points, and constant phase offsets are added to (M−1) of the phase profiles.

6. The method of claim 2, wherein the merit function is a measure of a depth of field of the multi-focal lens.

7. The method of claim 2, wherein the phase profiles for the subapertures produce spherical waves focusing to the different focal points.

8. The method of claim 2, wherein the multi-focal lens has M subapertures that focus to different focal points, the multi-focal lens contains an array of supercells, and each supercell contains a same pattern of M unit cells with one unit cell for each of the M subapertures.

9. The method of claim 2, wherein the multi-focal lens is also polarization multiplexed, and the subapertures of the multi-focal lens also focus light of different polarizations to different focal points.

10. A spatially multiplexed multi-focal optic comprising two or more subapertures that focus to different focal points; wherein the subapertures are characterized by phase profiles determined by the focal points, and at least one phase profile includes a constant phase offset that improves a multi-focal performance of the multi-focal optic.

11. The multi-focal optic of claim 10, wherein the multi-focal optic is also polarization multiplexed.

12. The multi-focal optic of claim 10, wherein the multi-focal optic is a reflective lens.

13. The multi-focal optic of claim 10, wherein the multi-focal optic is a diffractive lens.

14. The multi-focal optic of claim 10, wherein the multi-focal optic has a longer depth of field compared to if the constant phase offset were zero.

15. The multi-focal optic of claim 10, wherein the multi-focal optic has a higher normalized intensity integral compared to if the constant phase offset were zero.

16. The multi-focal optic of claim 10, wherein the multi-focal optic has a higher maximum intensity compared to if the constant phase offset were zero.

17. An optical system for an endoscope comprising:
   a substrate having at least one flat surface;
   an input aperture configured to receive light from an optical fiber in the endoscope, the received light propagating along an axial direction of the substrate;
   an optical routing structure comprising at least one flat optical component supported by the flat surface of the substrate; and
   a spatially multiplexed multi-focal lens comprising two or more subapertures that focus to different focal points; wherein the subapertures are characterized by phase profiles determined by the focal points, and at least one phase profile includes a constant phase offset that improves a multi-focal performance of the multi-focal lens.

* * * * *